Oct. 31, 1967 G. COTTREZ 3,350,652

BISTABLE DEVICE WITH MEMORY

Filed April 10, 1963

INVENTOR
GÉRARD COTTREZ
BY Robert Henderson
ATTORNEY 3,350,652
BISTABLE DEVICE WITH MEMORY Gérard Cottrez, Rueil, France, assignor to La Telemecanique Electrique, Nanterre, Seine, France, a company of France Filed Apr. 10, 1963, Ser. No. 271,911
Claims priority, application France, Apr. 26, 1962, 895,717
2 Claims. (Cl. 328—190)

ABSTRACT OF THE DISCLOSURE

A bistable trigger comprising two electronic members having in one cross-connection from the output electrode of one member to the control electrode of the other a winding associated with a magnetic core and, in the other cross-connection, a delaying network.

Figure 1:
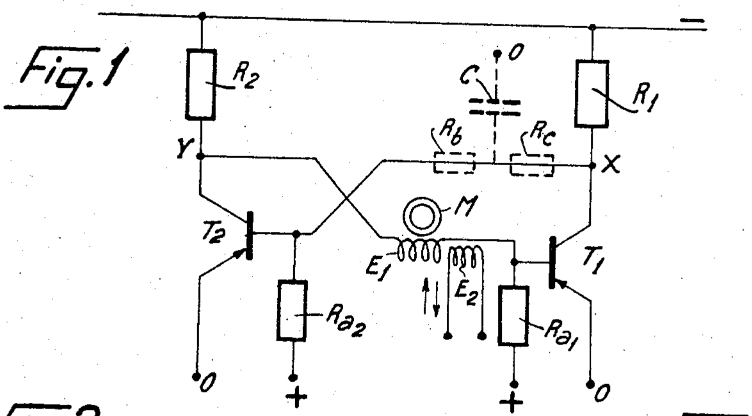

The end of the winding remote from said output electrode is connected via a diode to an intermediate point of a voltage divider, said point having a voltage lying between the values existing at said output electrode when the electronic member is conducting and non-conducting.

*Background of the invention*

This invention relates to bistable devices of the type comprising an electric circuit capable of assuming either of two reverse states of electrical equilibrium, on the application of successive electric pulses thereto. Such devices (also known as flip-flops and trigger circuits) are widely used in various fields, including especially digital computers and other apparatus involving digital techniques, automatic control servo-systems, and the like.

Such an electric bistable device can only be switched between its alternate states of stable electrical equilibrium after the device has first been made operative, or "switched on," by the application of electric power thereto. In the absence of power the device is in an idle or "off" condition.

As known, such a device comprises a pair of electronic members, such as tubes, transistors, or the like, each having a control electrode and an output electrode, with cross-connections from the output electrode of each member to the control electrode of the other. With such a circuit arrangement, when suitable biasing potentials have been applied to the electrodes, the circuit will only be capable of assuming two stable electrical states in one of which a first one of said members is conducting and the other is blocked, and in the other of which the first member is blocked and the other conductive. However, in the absence of biassing potentials applied to the electrodes, the circuit will assume a third, idle or off condition, in which both members are normally nonconductive.

When such a device is first switched on by the application of electric power to it after an idle or off period of any duration whatever, one of two things may be true. Either the circuit is perfectly balanced symmetrically, and in that case the initial state that will be assumed by the system on first being switched on is entirely unpredictable, being determined by minute factors of dissymmetry randomly affecting one or the other side of the circuit. Or the circuit possesses a definite dissymmetry or bias favouring the establishment of one of its states rather than the other, as because of a somewhat faster firing response of one of the electronic members than that of the other, in which case the circuit, on being switched on, will invariably assume such favoured state, e.g. the state in which the faster-response member is conductive and the slower-response member blocked.

In either case, it is seen that the first state of the circuit to be assumed after the circuit is switched on after an idle period, is completely unrelated to the state the circuit was in when it was last switched off. Now, in many circumstances, it is desirable to ensure that the initial state assumed by a bistable device on resuming operation after an idle period, is the last state it was in just before the idle period set in. That is the case in the field of automatic control of electrically-powered machinery, such as handling and hoisting equipment, where it is essential for safety and reliability in operation that after a temporary power failure involving both the electric motors powering the controlled machinery and the control apparatus including the bistable circuit itself, the over-all condition of the system will be the same on resumption of the power supply as it was just prior to the instant of failure.

It is an object of this invention to provide an electrical bistable device which, on resuming operation after an idle or off period of, practically, any duration whatever, can be relied on to assume initially that one of its two stable electrical states which corresponds to the electrical state it was in just before being switched off.

*Summary of the invention*

The invention in a broad aspect comprises in combination a bistable electric circuit switchable on and off and capable, when on, of assuming either of two stable electric states, and an auxiliary binary memory element connected to said circuit for memorizing the particular state the circuit is in at the instant the circuit is switched off, and operative to place the circuit initially in a corresponding one of its states when next switches on.

The memory element has control means connected to the circuit and continually acting, when the circuit is on, to set the memory element to one or the other of two memory states according as the circuit is in one or the other of its two electrical states. This ensures that whenever the circuit is switched off, the memory element will memorize the last electrical state of the circuit as a particular memory state of the element.

Preferably the binary memory element comprises a magnetizable element, such as a core of magnetic material having a rectangular hysteresis loop, so as to be capable of assuming two reverse states of magnetization to memorize the respective electric states of the circuit.

The circuit is so arranged that on being switched on it tends inherently to assume a first one of its electric states, and the memory element may then act on the circuit, as the latter is switched on, to overpower said tendency if the memory element is in one of its memory states but not otherwise.

The bistable circuit being of a general class similar to Eccles-Jordan flip-flop or trigger circuits comprising a pair of electronic members, e.g. transistors, each having a control and an output electrode, cross connections form the output electrode of each member to the control electrode of the other, and electric biassing means connected to said electrodes when the circuit is on, the circuit when on can only assume one of two different states in each of which a respective of said members is conductive and the remaining member blocked. Then according to the invention the circuit is so arranged that the response time required for a first one of said members to become conductive after the biassing means have been connected thereto, is shorter than the response time of the other member, whereby the circuit will tend initially to assume always a first one of its stable states, and the memory element is in the form of a magnetic core having means for at all times magnetizing it in one or the other sense depending on the current electrical state of said circuit when on, and is provided with an output winding inductively associated with said core and interposed in that one of said cross connections leading to the control electrode of said first member having the shorter response time, so as to impede through its reactance the establishment of conductivity through said faster-response member a time sufficient to enable the slower-response member to become conductive, if the magnetic state of the core corresponds to the other of said electrical states of the circuit but not otherwise.

Other objects and features of the invention will stand out from the ensuing description.

*The drawing*

Figure 2:
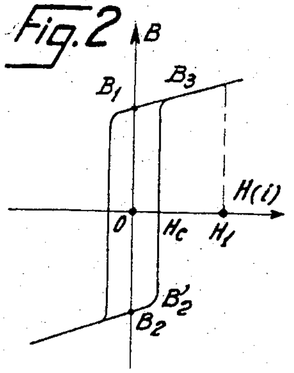
Figure 3:
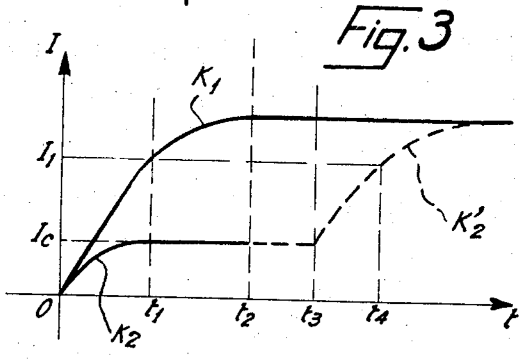

FIGURE 1 is a schematic diagram of a bistable trigger or multi-vibrator according to the invention, FIGURE 2 is an explanatory chart showing a hysteresis loop, and FIGURE 3 is a chart showing the establishment of biassing current with time to the bases of the respective transistors.

*Description of the preferred embodiment*

The circuit shown in FIGURE 1 illustrates a generally conventional bistable multivibrator circuit of the direct-coupled type, comprising two transistors T1 and T2, assumed herein to be of the p-n-p type, in which the control electrodes are the bases and the output electrodes the collectors of the transistors. In the usual manner, the collectors are connected by way of respective output or load resistors R1 and R2 to a negative biassing voltage, e.g. −36 volts, while the bases are connected through respective biassing resistors R*a*1 and R*a*2 to a positive biassing source, e.g. +12 volts. The emitters are connected in common to an intermediate biassing source, e.g. 0 volt. A cross-coupling connection is present to the base of each transistor from the collector of the other, as will presently be described in detail.

One of the transistors, specifically T2, is arranged to be substantially slower in firing response than the other. This is achieved by providing a delay network connected to the base of transitsor T2, said network comprising a pair of series resistors R*b* and R*c* connected in the coupling line from the base of T2 to the collector of T1, and a parallel condenser C connecting the junction of resistors R*b* and R*c* to the zero voltage. The provision of the network will introduce a time constant delaying the application of the full biassing current to the base of transistor T2. Hence in the circuit so far described and assuming a direct connection between the base of T1 and the collector of T2, the circuit would always be triggered to the state where T1 is conductive and T2 non-conductive when, after failure of supplying voltages, said voltages are again applied to the circuit.

However the coupling connection to the base of the fast-response transistor T1 from the collector of delayed-response transistor T2 includes a winding E associated with a magnetic memory core M of generally conventional type, as schematically shown. Owing to the reverse directions of the current in the winding E, as will be explained later, whether according to the trigger circuit is in one of its electrical state or in the other, the magnetic state of core M changes every time the electric state of the circuit changes. Core M has a substantially rectangular hysteresis loop, as indicated by the characteristic in FIGURE 2, wherein the magnetizing field strengths H, proportional to the current applied to the control winding E of the core, are plotted in abscissa and the magnetic induction or flux density values B are plotted in ordinates. Assuming the power supply is cut off from the circuit at any time, it will be readily understood from the foregoing that depending on the electrical condition of the circuit at the time the cut-off occurred, that is depending on whether one or the other of the transistors T1 and T2 was conductive at the time, the magnetic core M will retain one or the other of its opposite magnetic states, as indicated by the operating points B1 and B2 on the hysteresis loop of FIGURE 2, thereby memorizing the electric circuit condition that obtained at the time of power cut-off. This memory feature provided by the core is used according to the invention to ensure that on resumption of the application of power to the circuit, the initial operating state of the bistable circuit is the same that last obtained at the moment of cut-off. The manner in which this result is achieved can be explained as follows.

When the supplying voltages are restored, T1 being faster operating than T2, the current tends always to pass from the base of T1 towards Y in the winding E1 (i.e., in the direction 1). Assuming that initially the core is in the magnetic state corresponding to operating point B1, in other words, that the core was magnetized in the direction 1, the operative point of the core describes the continuous, constant-slope upper branch of the hysteresis loop, indicated as the branch B1–B3, in which the magnetic permeability $\mu=B/H$, represented by the slope, is substantially constant. As a result, the winding E behaves as a reactor at constant and low permeability and opposes a constant inductive low impedance to the flow of current through the coupling connection from the junction Y to the base of transistor T1 in which said winding is inserted. Said current, therefore, will increase with time in absolute value from zero to its maximum level in accordance with a continuous curve such as K1 (FIGURE 3), which is the usual curve representative of the establishment of a steady direct current flow through an inductor. The circuit values are so selected that the transistor T1 becomes conductive when the current applied through the cross-coupling to its base reaches a value I1, positioned on the rising portion of the curve K1, at the end of a predetermined time *t*1. On transistor T1 becoming conductive, its collector voltage will approach zero and this voltage applied from junction X through the cross coupling connection to the base of transistor T2 will bias the latter firmly to its nonconductive state. At this time the multivibrator circuit is in its first stable stage, with T1 conductive and T2 blocked.

If, conversely, the magnetic core M had been set to its reverse magnetic state indicated by point B2 in the graph of FIGURE 2, then when power is reapplied to the circuit, the core operating point will first describe the lower constant-slope branch of the hysteresis loop as from B2 to B′2, and the current through the coupling connection from junction Y to the base of T1 will start increasing along a rising curve K2 similar in character to the curve K1. Very soon however, as the current reaches a value I*c* which corresponds to the coercive field strength H*c* of the hysteresis loop, the magnetic flux in the core reverses sharply as from point B′2 to point B3, and this flux reversal generates a counter EMF which acts for a substantial length of time to maintain the current in the cross-connection at the constant value I*c* substantially lower than the current value I1 required to bias transistor T1 to its conductive state. If we assume first that transistor T2 is omitted from the circuit, then after a certain time lapse as required for complete flux reversal in the core M, at a time period *t*3, the operating point of the core would reach point B3 and follow the finite-slope upper branch of the hysteresis curve beyond that point, permitting the output current to resume its upward trend as indicated by the dotted curve K′2 in FIGURE 3, so that eventually at a time period *t*4 at which the curve reaches the ordinate I1 the transistor T1 would become conductive. However, before the time period *t*3 at which the increase in output current can resume, the delayed-response transistor T2 at a predetermined time period *t*2 has responded to the application of the bias voltage to its base by becoming conductive. Thereupon the collector of T2 delivers a blocking voltage which prevents the transistor T1 from subsequently becoming conductive. The bistable circuit has thus been stabilized in its second stable state, with T2 conductive and T1 blocked.

It will be seen from the foregoing that whichever the final electrical state assumed by the bistable circuit at the end of the preceding operating period, as memorised by the magnetic memory element M, the initial state assumed by the circuit on resumption of activity in its next operating period, can be made to be the same state as said final state in the preceding period.

It will also be observed from the foregoing description that the various circuit parameters should be so correlated that the delay in the firing response of transistor T2 (as represented by *t*2 in FIGURE 3) shall be longer than the time (*t*1) required to fire transistor T1 in its normal, undelayed operation, but shorter than the time (*t*3) required to fire said transistor T1 when delayed through the reversal of magnetic flux in the core M. The adjustment may be made to perform by inserting a selectable or adjustable resistor (not shown) in the cross coupling connection including winding E, since the resistance in series with that winding determines the delay involved in the flux reversal in the core.

For obtaining substantially equivalent currents in the winding E when the circuit is in either one of its two electrical states, first of all an additional resistor R*d* is inserted in the base circuit of transistor T1 for the purpose of symmetrically balancing the resistance values of R*b* and R*c*. Connected to the end point P of the winding E remote from collector terminal Y is a rectifier diode D2 the opposite pole of which is connected to a junction N of a voltage divider comprising two variable resistors R3 and R4 respectively connected to the negative biassing source and the zero voltage terminal. For the purpose of balancing the current in both the outputs, a diode D1 similar to D2 and connected to the same junction N is connected symmetrically to the cross coupling line at the collector junction X.

Assuming transistor T1 is conducting, current flows from the base of said transistor T1 through the winding E in the direction indicated by arrow 1, imparting one state of magnetization to the memory core M. Hence if T1 is the conductive transistor at the instant power is cut off, the fast-response transistor T1 becomes conductive because of the delay network associated with the other transistor T2, and the resulting blocking voltage applied by the collector of transistor T1 to the base of T2 stabilizes the circuit in the corresponding state, i.e. T1 conductive, T2 blocked, which was the last state prevailing at the previous cut-off.

If on the other hand the transistor T2 is conducting at the instant of power cut-off, the core M assumes its reverse state of magnetization, representable by arrow 2, to memorize that fact. This is obtained as follows. With transistor T2 conductive, its collector terminal Y is carried from a negative potential to a potential approaching zero, as is also the junction P. Point P is now at a more positive potential than is the negative junction N, so that current can flow from P to N through diode D2, diverting part of the current flow from the collector junction Y of transistor T2 and thus providing current flow through winding E in the direction represented by arrow 2 to magnetize the core M to its alternative state of magnetism reverse from the one first described. Hence, if the power is cut off from the circuit at a time when T2 conducts and T1 is blocked, this electrical state of the circuit is memorized in the core M as a state of magnetization represented by arrow 2.

Under these conditions, on resumption of power input to the circuit, as previously explained, current increases in the cross-connection base of T1 to Y according to the curve K2 (FIG. 3), i.e., current tends to flow through winding E in the direction 1 as earlier described, thereby tending to reverse the magnetism in the core. However, as expalined, the time required for full flux reversal in the core to be completed is made long enough to permit the delayed-response transistor T2 to become conductive in the meantime, whereupon its collector current blocks the transistor T1 in its non-conductive condition, while simultaneously producing current flow through winding E in the direction 2, as permitted by the diode D2, and hence retaining the core M in its previous state of magnetization.

The balancing diode D1 symmetrically arranged with respect to diode D2, and which similarly diverts part of the collector current from collector terminal X when the transistor T1 is conductive.

The input signals for setting and resetting the bistable circuit to its alternative stable electric states, and the output signals delivered by the circuit to indicate which state it is in, can be applied to and derived from the circuit in any of the conveninitional ways. By way of example, the collector junction X can be used as the input terminal for setting the circuit to the state where T2 is conductive and T1 blocked, and junction Y as the input terminal for resetting the circuit to its other state. The same terminals X and Y can serve to derive the reset and the set output signals from the circuit.

What I claim is:

1. In a bistable electric circuit comprising a pair of electronic members, each having an input, an output and a control electrode; to cross-connections from the output electrode of one member to the control electrode of the other; and electric biassing means connected to said electrodes imparting thereto variable potential values, whereby the circuit is capable of assuming either of two stable conditions in which one of the electronic members is conductive and the other is blocked; the combination of a magnetic core having a substantially rectangular hysteresis loop; a winding carried by said core and serially connected in one of said cross-connections; a voltage divider connected to said biassing means for providing a selected potential intermediate the potential values existing at the output electrode of said members when the latter is conductive or blocked; a diode connecting the end of said winding romote from said output electrode terminating the corresponding cross-connection to the said selected potential, the conducting direction of said diode being directed from said winding end towards said potential; a delaying network comprising first resistors serially connected in the other of said cross-connections and a shunt capacitor; and further resistors equivalent to said first resistors serially connected in said one cross-connection.

2. A bistable circuit according to claim 1, further comprising a second diode connecting said other cross-connection to said selected potential.

References Cited

UNITED STATES PATENTS

| | | | |
|---|---|---|---|
| 3,036,221 | 5/1962 | Kleinschmidt | 307—88.5 |
| 3,151,255 | 9/1964 | Halpin | 307—88.5 |

ARTHUR GAUSS, *Primary Examiner.*

DAVID J. CALVIN, B. P. DAVIS, *Examiners.*

UNITED STATES PATENT OFFICE

CERTIFICATE OF CORRECTION

Patent No. 3,350,652 October 31, 1967

Gérard Cottrez

It is hereby certified that error appears in the above numbered patent requiring correction and that the said Letters Patent should read as corrected below.

Figure 4:
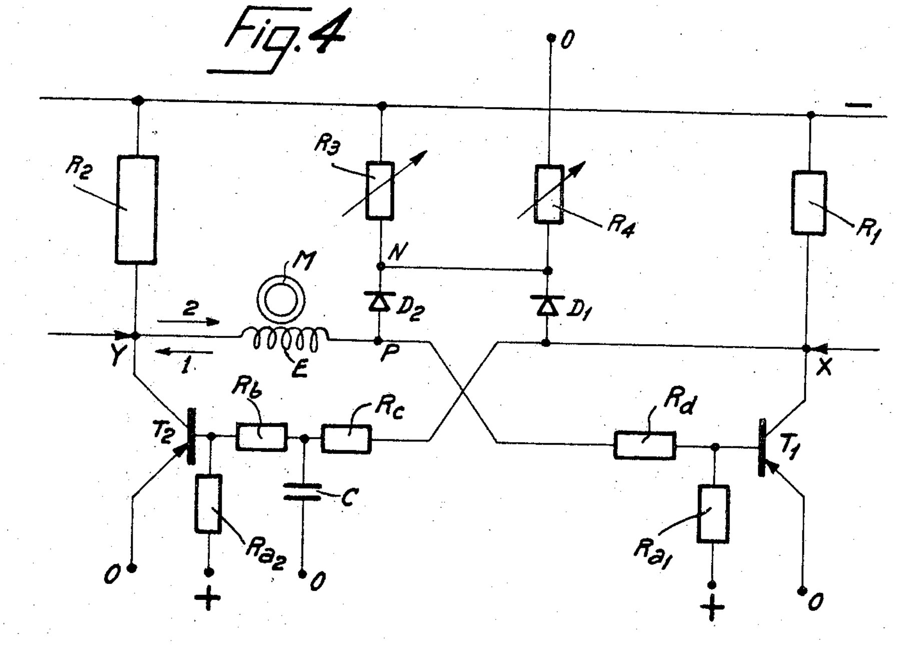

In the drawings, strike out Fig. 1 in its entirety and renumber "Fig. 4" as -- Fig. 1 --.

Signed and sealed this 14th day of January 1969.

(SEAL)

Attest:

Edward M. Fletcher, Jr.

Attesting Officer

EDWARD J. BRENNEI

Commissioner of Patents